J. SOLOMON.
SHOCK ABSORBING BUMPER.
APPLICATION FILED DEC. 8, 1919.

1,372,839.

Patented Mar. 29, 1921.

Inventor
Joseph Solomon
by Nestall and Wallace
his Attorneys

UNITED STATES PATENT OFFICE.

JOSEPH SOLOMON, OF LOS ANGELES, CALIFORNIA.

SHOCK-ABSORBING BUMPER.

1,372,839.  Specification of Letters Patent.  Patented Mar. 29, 1921.

Application filed December 8, 1919. Serial No. 343,148.

*To all whom it may concern:*

Be it known that I, JOSEPH SOLOMON, a subject of Great Britain, residing at Los Angeles, in the county of Los Angeles and State of California, have invented new and useful Improvements in Shock-Absorbing Bumpers, of which the following is a specification.

This invention relates to a bumper for automobiles constructed so as to absorb shocks.

It is the primary object of this invention to provide a bumper to absorb the shock of collisions, thereby reducing if not eliminating the injury and damage usually resulting therefrom. It is another object of this invention to provide a bumper, which contains within itself the means for receiving and confining the shock of collisions. It is a further object of this invention to provide a bumper bar which is resilient and flexible, and to this end I construct the shock receiving or buffer bar in a plurality of sections. It is a still further object of this invention to provide resilient means which has a minor and major resistance to collisions, whereby a light impact and a heavy impact will be taken care of. In addition to the foregoing mentioned objects, it is a still further object of this invention to provide a construction which will not rattle and is rigid.

Figure 1:
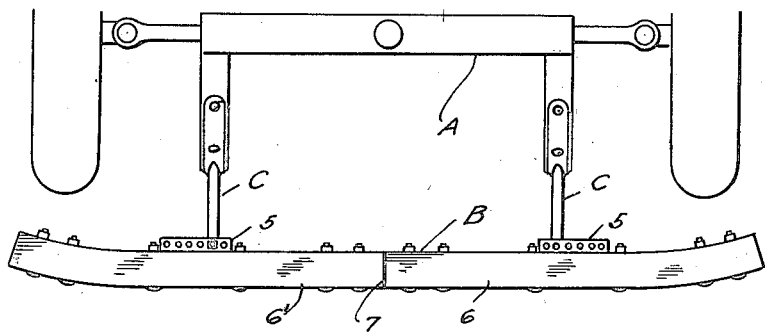
Figure 2:
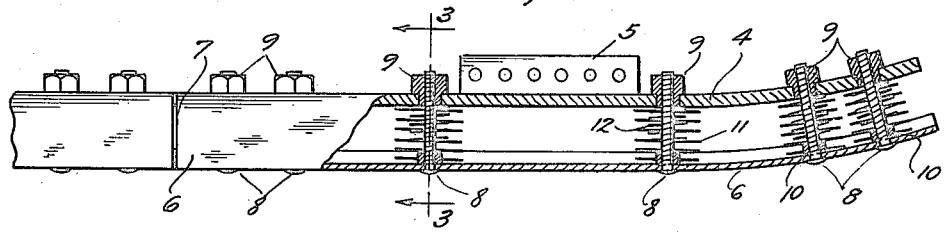

I accomplish the above mentioned objects as well as other objects and corresponding accomplishments by means of the embodiment of my invention illustrated in the accompanying drawing, in which:

Figure 1 is a plan view of the front part of an automobile equipped with my improved bumper; Fig. 2 is an enlarged fragment of the bumper partly in section; and Fig. 3 is an enlarged section taken on the line 3—3 of Fig. 2.

Referring more particularly to Fig. 1, A indicates an automobile to which my improved bumper B is attached by means of brackets C secured to the front springs. The particular method of securing the bumper to the automobile forms no part of my invention, and the means shown herein is for illustrative purposes only.

Figure 3:
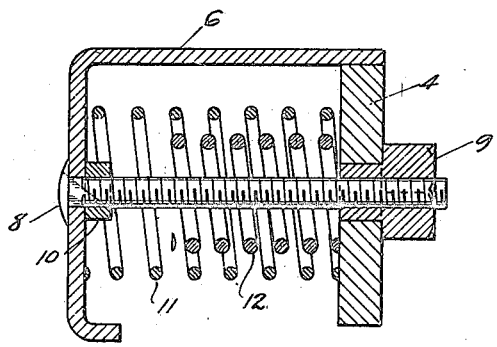

Referring more particularly to Figs. 2 and 3, a rigid supporting bar 4 extends across the front of the automobile and is of a form similar to the common bumper bar. To provide for the attachment of the bar to automobiles of varying widths with respect to the attachment brackets, I have formed on the bar horizontally extending ribs 5 having series of bolt holes, whereby the brackets may be bolted to the ribs. Extending in front of the bar 4 is a channel or buffer bar 6 preferably formed with a long upper leg and a short lower leg. I prefer to construct the channel bar in two sections 6 and 6′ so that it is split at the center as indicated by 7 for a purpose later described.

Securing each channel section to the bar are carriage bolts 8 extending through registering bolt holes in the channel and supporting bar. The bolt holes in the supporting bar are of larger diameter than the shank of the bolt so as to provide for receiving bushing portions of nuts 9. Lock nuts 10 securely hold the bolts to the channel bar. Encircling each of the bolts is a minor shock absorbing spring 11, normally in engagement with the channel bar and the supporting bar. Disposed within the spring 11 are major springs 12, which normally are out of contact with the channel bar. I prefer to use six bolts for each section, a pair adjacent the end of the section, a pair adjacent the center end, and one on either side of the rib 5. This provides for receiving and absorbing shocks which are received upon the ends of the bumper or on either side of the center. Any shock or impact received adjacent the ribs or brackets will be absorbed by all of the springs. Each section of the channel bar is similarly mounted. There are in the construction shown twelve minor springs to receive light impacts, and twelve major springs to support the minor springs in receiving heavy impacts.

When a car is traveling at a comparatively low speed, such as ten miles per hour, and collides, the minor springs will recoil; and if the car collides at a greater speed, both the minor and major springs will recoil. This is greatly beneficial, because springs which are too rigid will not recoil at all in a minor collision. By using a plurality of channel sections, in this case two sections, in the place of one long channel bar, the resiliency and flexibility of the bumper is increased.

The construction of the device with combination nuts and bushings makes the bumper rattle proof, as the parts are held rigidly in normal position. In the event of a collision, the bushings are pushed out of their pockets, but regain their position therein when pressure is released from the channel bar.

It is obvious that I have provided a bumper not only minimizing the danger and damage to the car equipped with the same, but also protecting the other car or property with which it collides.

What I claim is:

1. A bumper comprising a supporting bar adapted to be attached to an automobile, a buffer bar consisting of a plurality of sections mounted on said supporting bar for independent movement to and from the latter, and shock absorbing springs interposed between said bars.

2. A bumper comprising a supporting bar adapted to be attached to an automobile, a buffer bar, bolts secured to said buffer bar and extending through said supporting bar, nuts on said bolts equipped with bushings normally resting in pockets in said supporting bar, and shock absorbing springs interposed between said bars and on said bolts.

3. A bumper comprising a supporting bar adapted to be attached to an automobile, a buffer bar consisting of a plurality of sections, bolts secured to said buffer bar and extending through said supporting bar, nuts on said bolts equipped with bushings normally resting in pockets in said supporting bar, and shock absorbing springs mounted on said bolts and interposed between said bars.

4. A bumper comprising a supporting bar adapted to be attached to an automobile, a buffer bar, bolts secured to said buffer bar and extending through said supporting bar, nuts on said bolts equipped with bushings normally resting in pockets in said supporting bar, and minor and major shock absorbing springs mounted on said bolts.

5. A bumper comprising a supporting bar adapted to be attached to an automobile, a buffer bar consisting of a plurality of sections, bolts secured to said buffer bar and extending through said supporting bar, nuts on said bolts equipped with bushings normally resting in pockets in said supporting bar, and minor and major shock absorbing springs mounted on said bolts.

6. A bumper comprising a supporting bar adapted to be attached to an automobile, a channel bar consisting of a plurality of sections, bolts secured to said buffer bar and extending through said supporting bar, nuts on said bolts equipped with bushings normally resting in pockets in said supporting bar, and minor and major shock absorbing springs mounted over said bolts and interposed between said bars so that they are housed within said channel.

In witness that I claim the foregoing I have hereunto subscribed my name this 1st day of December, 1919.

JOSEPH SOLOMON.